US 9,607,032 B2

(12) United States Patent
Gubin et al.

(10) Patent No.: US 9,607,032 B2
(45) Date of Patent: Mar. 28, 2017

(54) UPDATING TEXT WITHIN A DOCUMENT

(71) Applicant: Google Inc., Mountain View, CA (US)

(72) Inventors: Maxim Gubin, Walnut Creek, CA (US); Sangsoo Sung, Palo Alto, CA (US); Krishna Bharat, Palo Alto, CA (US); Kenneth W. Dauber, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 227 days.

(21) Appl. No.: 14/275,444

(22) Filed: May 12, 2014

(65) Prior Publication Data

US 2015/0324413 A1    Nov. 12, 2015

(51) Int. Cl.
| | | |
|---|---|---|
| *G06F 3/0481* | (2013.01) |
| *G06F 17/30* | (2006.01) |
| *G06F 3/048* | (2013.01) |
| *G06F 17/24* | (2006.01) |
| *G06F 17/27* | (2006.01) |
| *G06Q 10/10* | (2012.01) |

(52) U.S. Cl.
CPC ........ *G06F 17/30353* (2013.01); *G06F 3/048* (2013.01); *G06F 17/24* (2013.01); *G06F 17/278* (2013.01); *G06F 17/30112* (2013.01); *G06F 17/30637* (2013.01); *G06Q 10/10* (2013.01)

(58) Field of Classification Search
None
See application file for complete search history.

(56) References Cited

U.S. PATENT DOCUMENTS

| 5,469,538 | A | | 11/1995 | Razdow |
| 5,557,723 | A | | 9/1996 | Holt |
| 5,754,737 | A | | 5/1998 | Gipson |
| 6,128,628 | A | * | 10/2000 | Waclawski .............. G06F 11/32 |

(Continued)

FOREIGN PATENT DOCUMENTS

| CA | 2711081 A1 | 1/2011 |
| EP | 843266 A3 | 1/2000 |

(Continued)

OTHER PUBLICATIONS

International Search Report and Written Opinion in International Application No. PCT/US2015/029873, mailed Aug. 27, 2015, 10 pages.

(Continued)

*Primary Examiner* — Phenuel Salomon
(74) *Attorney, Agent, or Firm* — Fish & Richardson P.C.

(57) ABSTRACT

Methods, systems, and apparatus, including computer programs encoded on a computer storage medium, for updating text within a document. In one aspect, a method includes identifying an entity based on entity text included in document text of a document; identifying a time-sensitive attribute for the entity based on attribute text included in the document text; identifying a first value for the time-sensitive attribute based on value text included in the document text; generating a query specifying the entity; providing the query to a search system that provides a result value for the time-sensitive attribute of the entity included in the query; and providing, to a user device that is currently accessing the document, result data that causes presentation of the result value as a replacement for the first value.

20 Claims, 4 Drawing Sheets

(56) References Cited

U.S. PATENT DOCUMENTS

| | | | |
|---|---|---|---|
| 6,256,633 B1 | 7/2001 | Dharap | |
| 6,389,427 B1* | 5/2002 | Faulkner | G06F 17/30106 707/741 |
| 6,564,213 B1 | 5/2003 | Ortega | |
| 6,918,086 B2 | 7/2005 | Rogson | |
| 7,113,950 B2 | 9/2006 | Brill | |
| 7,249,123 B2 | 7/2007 | Elder | |
| 7,340,477 B1* | 3/2008 | Tolbert | G06F 17/30592 |
| 7,451,397 B2 | 11/2008 | Weber | |
| 7,487,456 B2 | 2/2009 | Brooke | |
| 7,630,980 B2 | 12/2009 | Parikh | |
| 7,660,806 B2 | 2/2010 | Brill | |
| 7,672,833 B2 | 3/2010 | Blume | |
| 7,751,533 B2 | 7/2010 | Maekelae | |
| 7,752,148 B2 | 7/2010 | Yu | |
| 7,805,492 B1 | 9/2010 | Thatcher | |
| 7,890,526 B1* | 2/2011 | Brewer | G06F 17/3064 707/767 |
| 7,930,302 B2 | 4/2011 | Bandaru | |
| 7,984,035 B2 | 7/2011 | Levin | |
| 7,996,419 B2 | 8/2011 | Pfleger | |
| 8,073,877 B2 | 12/2011 | Irmak | |
| 8,185,448 B1 | 5/2012 | Myslinski | |
| 8,321,410 B1 | 11/2012 | Bharat | |
| 8,386,241 B2 | 2/2013 | Goud | |
| 8,386,926 B1 | 2/2013 | Matsuoka | |
| 8,423,424 B2 | 4/2013 | Myslinski | |
| 8,429,099 B1 | 4/2013 | Perkowitz | |
| 8,441,377 B2 | 5/2013 | Liu | |
| 8,452,799 B2 | 5/2013 | Zhou | |
| 8,458,046 B2 | 6/2013 | Myslinski | |
| 8,510,173 B2 | 8/2013 | Myslinski | |
| 8,521,764 B2 | 8/2013 | Pfleger | |
| 8,594,996 B2 | 11/2013 | Liang | |
| 8,688,698 B1 | 4/2014 | Black et al. | |
| 8,712,934 B2* | 4/2014 | Gross | G06F 17/30867 706/12 |
| 9,081,829 B2* | 7/2015 | Bhave | G06F 17/30551 |
| 2002/0156816 A1* | 10/2002 | Kantrowitz | G06F 17/273 715/256 |
| 2006/0235873 A1 | 10/2006 | Thomas | |
| 2007/0174255 A1 | 7/2007 | Sravanapudi | |
| 2007/0226554 A1* | 9/2007 | Greaves | G06F 11/3003 714/724 |
| 2008/0126075 A1 | 5/2008 | Thorn | |
| 2008/0140629 A1* | 6/2008 | Porter | G06F 17/30595 |
| 2008/0165747 A1* | 7/2008 | Budka | H04W 72/1284 370/337 |
| 2008/0270380 A1* | 10/2008 | Ohrn | G06F 17/30654 |
| 2009/0077037 A1* | 3/2009 | Wu | G06F 17/3097 |
| 2009/0083028 A1 | 3/2009 | Davtchev | |
| 2009/0099901 A1 | 4/2009 | Sah | |
| 2010/0286979 A1 | 11/2010 | Zangvil | |
| 2011/0246462 A1* | 10/2011 | Wu | G06F 17/30864 707/736 |
| 2012/0239381 A1 | 9/2012 | Heidasch | |
| 2012/0265784 A1* | 10/2012 | Hsu | G06F 17/3064 707/771 |
| 2013/0031106 A1 | 1/2013 | Schechter | |
| 2013/0060560 A1 | 3/2013 | Mahkovec | |
| 2013/0124964 A1* | 5/2013 | Viegas | G06F 17/278 715/230 |
| 2013/0151240 A1 | 6/2013 | Myslinski | |
| 2013/0173604 A1 | 7/2013 | Li | |
| 2013/0198163 A1 | 8/2013 | Slezak | |
| 2013/0198196 A1 | 8/2013 | Myslinski | |
| 2013/0212111 A1 | 8/2013 | Chashchin | |
| 2013/0226935 A1 | 8/2013 | Bai | |
| 2013/0332822 A1 | 12/2013 | Willmore | |

FOREIGN PATENT DOCUMENTS

| | | |
|---|---|---|
| EP | 1887451 A2 | 2/2008 |
| EP | 2053526 A1 | 4/2009 |
| EP | 2280332 A1 | 2/2011 |
| EP | 2639673 A1 | 9/2013 |
| WO | WO2004092979 A3 | 10/2005 |
| WO | WO2008120042 A1 | 10/2008 |

OTHER PUBLICATIONS

"Lemma What? A Guide to Text Processing and Machine Learning API Terms" [online] [retrieved Apr. 7, 2014]. http://blog.mashape.com/post/50655824209/lemma-what-a-guide-to-text-processing-and-machine, 5 pages.

Lewis, David D. et al, [online] [retrieved on Apr. 7, 2014]. "A Comparison of Two Learning Algorithms for Text Categorization" http://citeseerx.ist.psu.edu/viewdoc/download?doi=10.1.1.49.860&rep=rep1&type=pdf, 14 pages.

Ruiz-Casado, et al., "From Wikipedia to Semantic Relationships: a Semi-automated Annotation Approach" [online] [retrieved on Apr. 7, 2014]. http://citeseerxist.psu.edu/viewdoc/download?doi=10.1.1.84.899&rep=rep1&type=pdf, 14 pages.

Tran et al., "Automatic Detection of Outdated Information in Wikipedia Infoboxes," [online] [retrieved on Apr. 7, 2014]. Retrieved from: http://pics.cicling.org/2013/rcs/Automatic%20Detection%20of%20Outdated%20Information%20in%20Wikipedia%20Infoboxes.pdf, 12 pages.

Office,"Insert and format field codes in Word 2007," [online] [retrieved on Apr. 7, 2014]. Retrieved from: http://office.microsoft.com/en-us/word-help/insert-and-format-field-codes-in-word-2007-HA010338798.aspx?CTT=5&origin=HA010100426#BM5, 5 pages.

Microsoft Support, "The FILENAME field does not automatically update when you open a document in Word" [online] [retrieved on Apr. 7, 2014]. Retrieved from: http://support.microsoft.com/kb/832897, 2 pages.

dunxd.com "Word 2010 Template with Auto-updating fields," [online] [retrieved on Apr. 7, 2014]. Retrieved from: http://dunxd.com/2012/08/08/word-2010-template-with-auto-updating-fields/, 2 pages.

* cited by examiner

UPDATING TEXT WITHIN A DOCUMENT

BACKGROUND

This specification relates to updating text within a document.

Document editing applications provide authors with many tools to assist users with drafting documents, such as word processing documents, e-mail messages, and network blog posts. The assistance provided by these tools varies greatly, from design assistance tools for designing layouts and formatting text, to revision tracking tools for tracking document changes. Other tools provide assistance based on the text included in the document, such as spell checking tools that check text for spelling errors, and grammar checking tools that check text for grammatical errors. Each tool provided by a document editing application is generally designed to enhance the user's experience in drafting a document.

SUMMARY

This specification describes technologies relating to updating text within a document.

In general, one innovative aspect of the subject matter described in this specification can be embodied in methods that include the actions of identifying an entity based on entity text included in document text of a document; identifying a time-sensitive attribute for the entity based on attribute text included in the document text; identifying a first value for the time-sensitive attribute based on value text included in the document text; generating a query specifying the entity; providing the query to a search system that provides a result value for the time-sensitive attribute of the entity included in the query; and providing, to a user device that is currently accessing the document, result data that causes presentation of the result value as a replacement for the first value. Other embodiments of this aspect include corresponding systems, apparatus, and computer programs, configured to perform the actions of the methods, encoded on computer storage devices.

These and other embodiments can each optionally include one or more of the following features. The method may further include: providing data to a user device that is currently accessing the document that causes a prompt to be displayed for the first value, the prompt including a user-selectable interface element that will cause the first value to be updated, and providing the query and providing the user device with result data may be performed only in response to receiving user input indicating selection of the user-selectable interface element.

The method may further include: providing data to the user device that causes a prompt to be displayed, the prompt identifying the first value for the time-sensitive attribute and including a user-selectable interface element that, upon selection, will cause the first value for the time-sensitive attribute to be tagged as a time-sensitive attribute value.

The method may further include: generating a tag for the first value for the time-sensitive attribute in response to receiving user input indicating a selection of the user-selectable interface element, the tag indicating that the first value is time-sensitive, and wherein the tag causes the first value to be updated in response to one or more predetermined actions.

The one or more predetermined actions may include one or more of: the document being accessed by a user device; receipt of user input indicating that the first value should be updated; or receipt of a request to update the first value from a document system.

Identifying a time-sensitive attribute for the entity based on the attribute text may include determining that the time-sensitive attribute is included in a list of predetermined time-sensitive attributes.

The list of predetermined time-sensitive attributes may include one or more of: a price; an age; an environmental condition; a person holding a title; or a time.

Attributes identified by the document text may not have been previously been identified as time-sensitive. The query may specify the time-sensitive attribute for the entity.

Particular embodiments of the subject matter described in this specification can be implemented so as to realize one or more of the following advantages. Providing suggestions for inclusion in a document may reduce the need for users to manually draft portions of a document. A user may forget, or be unaware of, various facts or other information that the user wishes to include in a document, and a suggestion system may be able to assist the user by providing them with information the user needs, without requiring explicit user requests for assistance. In addition, facts that change over time, such as the weather or the price of a good or service, may be automatically updated for a user. A document editing application may, for example, check facts included in a document to determine if they are time-sensitive, and verify their accuracy, notifying a user of outdated facts and/or providing current facts. Providing suggestions in the foregoing manner may enhance users' document authoring experience and provide users' with information that satisfies their informational needs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
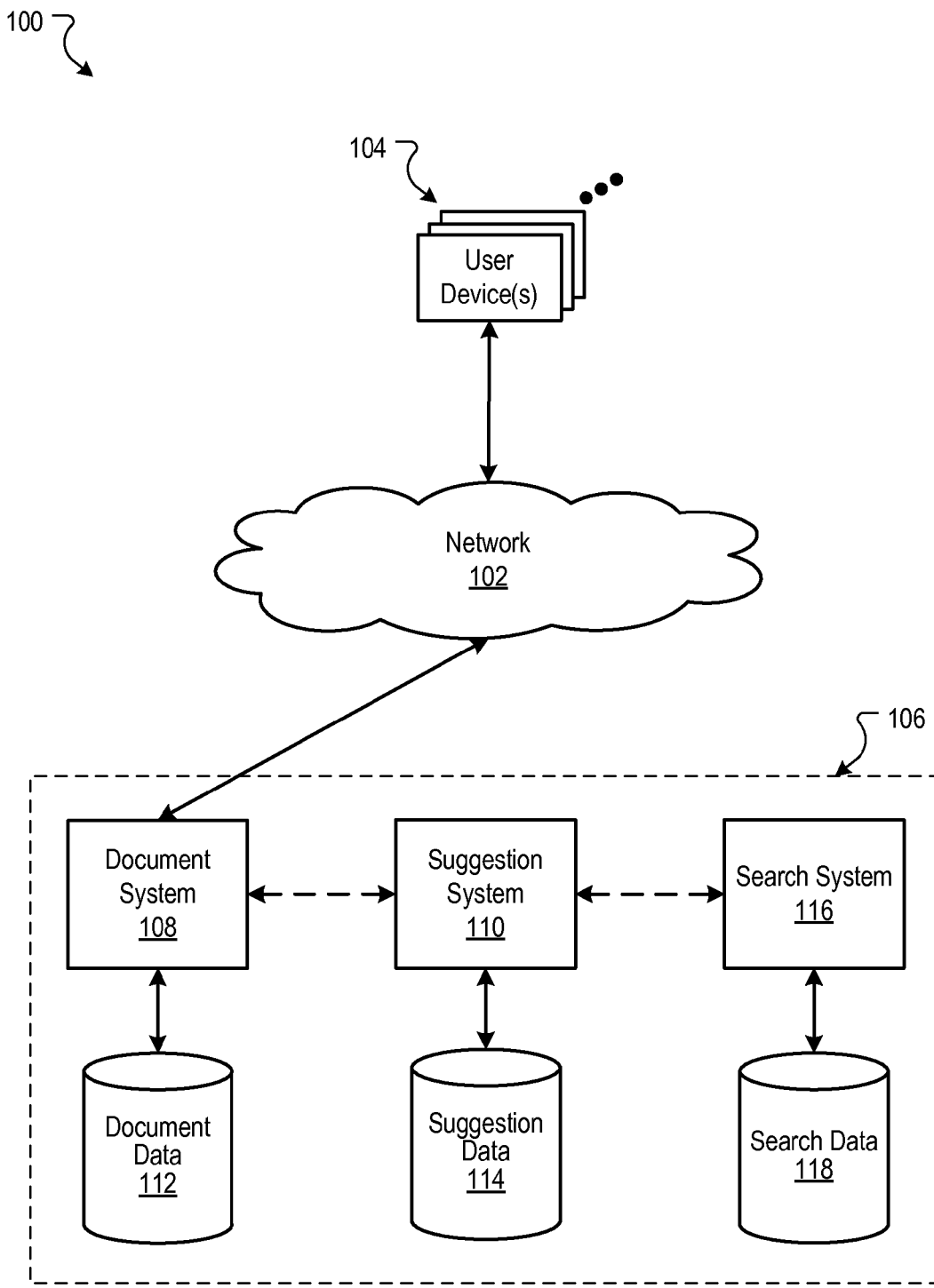
FIG. 1 is a block diagram of an example environment in which suggestions are provided for time-sensitive attributes in a document.

A suggestion system provides suggestions for users editing documents. A document is a computer file containing text, such as a word processing document, an e-mail message, a blog post, an SMS, MMS or similar text message, or a web page, as well as text entry fields in applications and the like. Users may edit documents using a document editing application, which may include, for example, a word processor application, an e-mail client application, an illustration application, a spreadsheet application, a web-based blogging application, etc. A suggestion system may use information from various sources to assist a user in drafting and/or editing a document by providing suggestions. Suggestions may range in size from suggested characters, words, phrases, sentences, paragraphs, formulas, abbreviations, symbols, or more. As used herein, a "word" or "words" may encompass any of the foregoing, e.g., a suggested "word" may be one or more characters, words, phrases, sentences, paragraphs, formulas, abbreviations, symbols, etc. Whether suggestions are provided or not, how they are provided, and the content of the suggestions depend on various types of information related to, for example, the user editing the document, existing text included in the document, current text being inserted by the user, user data related to the user editing the document, information regarding other users and/or documents of other users, and/or other information.

In some implementations, a suggestion system can identify facts related to entities referenced in the text of a document and provide these facts as suggestions to a user device editing the document. In some implementations, entities are topics of discourse. In some implementations, entities are concepts or things that are distinguishable from one another, such as entities in a knowledge graph that relates entities by their corresponding attributes. The suggestion system also identifies time-sensitive values, e.g., facts, in a document and periodically updates those values as they change. For example, if a document includes a stock price that fluctuates over time, the suggestion system can prompt a user who is accessing that document for user input confirming that the stock price should be updated and, in some implementations, tagged for future updating as well, e.g., automatically updated each time the document is accessed.

In operation, the suggestion system accesses a document that includes text that, in some implementations, has not previously been identified as time-sensitive. For example, the suggestion system may access a word processing document or e-mail stored in a document storage device. Entities and time-sensitive entity attributes are identified in the text of the accessed document. For example, an entity system included in or in communication with the suggestion system may identify an entity, such as an airline flight, and a time-sensitive attribute for the airline flight, such as departure time.

A value is identified for the time-sensitive attribute. In the previous example, a time, e.g., 9:00 a.m., may be identified as the value for the attribute, departure time. After identifying the time-sensitive attribute value, the suggestion system may check the value periodically, or on demand, by generating a query that specifies the entity, e.g., the flight, and the time-sensitive attribute, e.g., departure time, and providing this query to a search system, such as an Internet search system or a time-sensitive attribute value index. The search system provides a result value for the time-sensitive attribute, and the result value can be provided to a user device accessing the document as a suggested replacement for the initial time-sensitive value.

By way of example, after purchasing a ticket for a flight, a user may receive a flight confirmation e-mail that indicates a flight number and information related to the flight, such as the departure gate and departure time. The suggestion system may identify the time-sensitive attributes in the e-mail, e.g., departure gate and departure time, and prompt the user with a request to keep the time-sensitive values updated. In situations where a user confirms that the suggestion system should keep the time-sensitive values updated, the suggestion system may update the values periodically, e.g., each time the user accesses the e-mail, or after receiving user input explicitly requesting an update.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content item management system that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content item management system.

These features and additional features are described in more detail below.

FIG. 1 is a block diagram of an example environment 100 in which suggestions are provided for time-sensitive attributes in a document. A computer network 102, such as a local area network (LAN), wide area network (WAN), the Internet, or a combination thereof, connects user devices 104 to a document system 108. The online environment 100 may include any number of user devices 104. In some implementations, connections between user devices 104 and the document system 108 may be local, e.g., the document system 108 may be part of or directly connected to a user device rather than connected across the network 102.

A user device 104 is an electronic device capable of requesting and receiving resources, such as documents, over the network 102. Example user devices 104 include personal computers, mobile communication devices, and other devices that can send and receive data over the network 102. A user device 104 typically includes a user application, such as a web browser, to facilitate the sending and receiving of data over the network 102. The web browser can enable a user to display and interact with text, images, videos, music, web applications, and other information typically located on a web page at a website.

A document system 108 communicates with one or more user devices 104 to provide the user devices 104 with access to documents, e.g., by providing a document editing application interface. For example, the document system 108 could be an e-mail server that provides an e-mail interface through which user devices 104 read and write e-mails, or a cloud word processing server that provides an interface through which user devices 104 create, modify, and share word processing documents, presentations, and spreadsheets.

A suggestion system 110 provides suggestions for inclusion in a document. For example, the suggestion system 110 may receive document text that was provided to a document system by a user device, and the suggestion system 110 can use the document text to identify time-sensitive attributes and identify suggested text to provide the user device. The suggestion system 110 may receive document text from the document system 108, document data 112, or, in some implementations, directly from a user device. In some implementations, the suggestion system 110 may include an entity identification component, or be connected to an entity system, capable of identifying entities, attributes, attribute values, and relationships between them in text.

The search system 116 provides search results for queries. The search system 116 may be, for example, an Internet search system, a database search system, or another type of search system or combination of search system types. The search system 116 may receive queries from the suggestion system 110 and provides search results in response. For example, an Internet search engine may receive a query, such as "who is the starting pitcher for Atlanta in today's baseball game," and the Internet search engine may search an index of Internet resources to obtain one or more results for the query.

Document data 112 is used to store data used by the document system 112 and may include, for example, document files, user data, and performance measures. The suggestion data 114 is used to store data used by the suggestion system 110 and may include, for example, an index of suggestions, suggestion model training data, performance measures for suggestions, an index of entities and entity attributes. The search data 118 is used to store data used by the search system 116 and may include, a resource index. The resource index may also include an index or other searchable data structure that describes entities and their corresponding attributes. Other information may also be stored in the document data 112, suggestion data 114, and/or the search data 118. While the storage devices are depicted separately in the example environment 100, in some implementations some or all of the document data 112, suggestion data 114, and/or search data 118 may be combined or stored separately in other data storage devices.

Similarly, while the document system 108, suggestion system 110, and search system 116 are depicted separately from one another, in some implementations they may be part of the same system. For example, the suggestion system 110 could be a component of the document system 108. In some implementations, additional components or systems may be used, separately from or included in one of the depicted components. For example, an entity system may be used, separate from the suggestion system 110, to identify entities and attributes within text. In some implementations, the document system 108 or a portion thereof, such as a document editing application, may be included on a user device. For example, a document editing application running locally on a user device may communicate with a document system 108, suggestion system 110, and/or search system 116 through the network 102.

Figure 2:
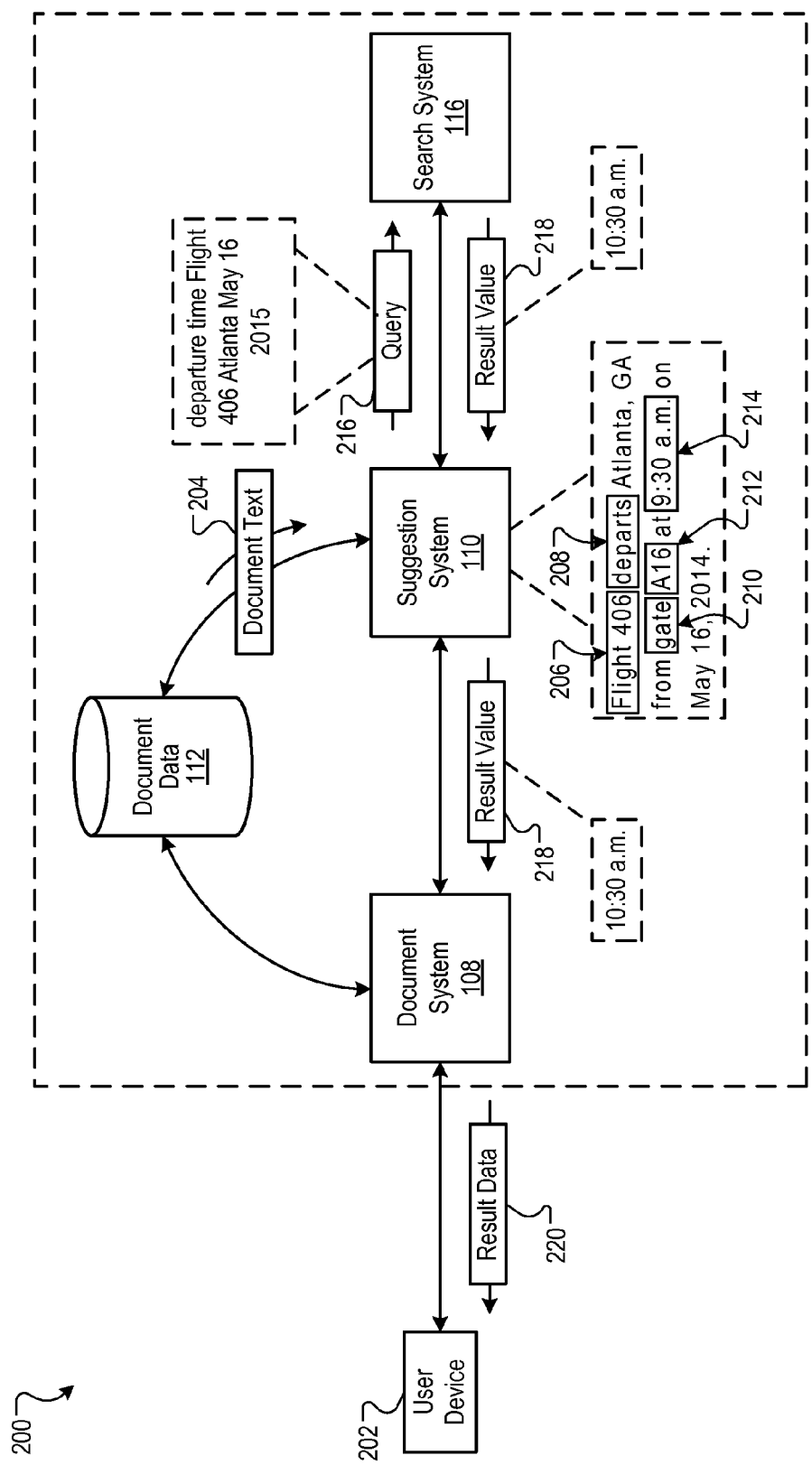
FIG. 2 is an illustration of an example process for providing suggestions for time-sensitive attributes within a document.

FIG. 2 is an illustration of an example process 200 for providing suggestions for time-sensitive attributes within a document. The document system 108 is in communication with a user device 202 and may be, for example, a social media blogging system that provides a blogging application that the user device 202 uses to read and/or draft blog posts. As another example, the document system 108 may be an e-mail system that provides an e-mail application that the user device 202 uses to read and/or draft e-mails. Suggestions may be provided for a variety of different application types, such as spreadsheet applications, illustration applications, and micro-blogging applications, to name a few. In the example process 200, documents being read, edited, and/or drafted by the user device 202 are stored in the document data 112 and accessible to the user device 202 through the document system 108. In some implementations, the document being read, edited, and/or drafted by the user device 202 may instead, or in addition, be stored locally on the user device 202 and made accessible to the document system 108 by a user of the user device 202.

The suggestion system 110 obtains document text 204, e.g., from the document data 112, the document system 108, or from the user device 202. The document text 204 may be any text that is included in a document, and generally includes text that has not previously been identified as time-sensitive. In some implementations, time-sensitive text is text that has been previously tagged as time-sensitive, e.g., by the suggestion system 110. In the example process 200, the document text 204 reads, "Flight 406 departs Atlanta, Ga. from gate A16 at 9:30 a.m. on May 16, 2014." The document text 204 may be obtained, for example, from an e-mail sent to a user of the user device 202.

The suggestion system 110 identifies an entity referenced by entity text 206 included in the document text 204. In some implementations, the identification is performed by an entity identification component or system, e.g., using an entity identification model that has been trained to identify entities included in text. In the example process 200, the text, "Flight 406," references an entity, e.g., a particular airline flight. While "Flight 406" is identified as entity text referencing an entity in this example, other text included in the document text may also be entity text, e.g., "Atlanta, Ga.," "gate A16," and "May 16, 2014," may also be entity text, e.g., referencing a city, an airport gate, and a date.

After identifying an entity, the suggestion system 110 identifies a time-sensitive attribute for the entity based on attribute text 208 included in the document text 204. For example, the text 208, "departs," references the departure time for flight 406, which may be a time-sensitive attribute of flight 406. In addition, the combination of the text 208, "departs," and the text 210, "gate," references the departure gate for flight 406, which may also be a time-sensitive attribute of flight 406. Each of these attributes, e.g., departure time and departure gate, are identified as time-sensitive, e.g., by the suggestion system 110 or an entity identification component separate from or included in the suggestion system 110.

In some implementations, the determination that an attribute is time-sensitive may be made based on a predetermined list of time-sensitive attributes, an index of entities that specifies time-sensitive attributes for entities, user input, and/or output from a separate entity or fact-checking system that determines an attribute is a time-sensitive fact. For example, a pre-determined list of attributes may include attributes such as price, age, environmental condition, a person's title, the person holding a title, or time, to name a few; and, attributes may be identified as one of the pre-determined attributes included in the list. Other methods may also be used to determine whether or not an attribute is time-sensitive, e.g., an entity identification system may use a time-sensitive attribute detection model trained to identify an attribute as time-sensitive using a set of heuristics about attributes.

Values are associated with time-sensitive attributes, and a value may be identified for the time-sensitive attribute based on value text 212 included in the document text 204. For example, the text 212, "A16," is a value for the departure gate attribute, and the text 214, "9:30 a.m.," is a value for the departure time attribute. Each value is time-sensitive, meaning that it is subject to change over time. For example, the departure gate and departure time for flight 406 on May 16, 2014 may change, or remain the same, as time passes. May 16, 2014, while not used in the example process 200, may also be identified as a time-sensitive attribute value, e.g., the departure date of flight 406.

In some implementations, some or all of the entities, time-sensitive attributes, and time-sensitive attribute values are identified using an entity system or entity identification component. For example, document text may be provided to an entity identification model that has been trained to identify entities included in text. Each entity may be associated, e.g., in an index, one or more time-sensitive attributes, which can be identified from keywords included in the text. In some implementations, identification of entities, time-sensitive attributes, and/or time-sensitive attribute values may be performed by an entity system. An entity system may be separate from the other components depicted in the example process 200, or may be included, for example, in the suggestion system 110 or document system 108.

In some implementations, the suggestion system 110 and/or document system 108 may request feedback from the user device 204, e.g., by providing data that causes a prompt to be displayed on the user device 204. For example, the user may be prompted to determine whether or not an identified attribute value should be updated. As another example, a user may be prompted to tag the time-sensitive attribute value as "time-sensitive," which may cause the value to be updated in response and/or in the future. For example, a value tagged as time-sensitive may be stored as metadata for a document, causing the value to be updated in the future. In some implementations, a user device may also provide input specifying when and/or how often time-sensitive values are updated, e.g., every time a document is accessed by the user, only in response to a prompt displayed upon each document access, or only when a user selects a particular time-sensitive attribute value to be updated.

The suggestion system generates a query 216 that specifies the entity and, in some implementations, the time-sensitive attribute. For example, the query 216 in the example process states, "departure time Flight 406 Atlanta May 16, 2014" The query specifies the entity, Flight 406 on May 14 from Atlanta, and the time-sensitive attribute, the departure time. Queries may be generated in many forms and may be dependent on the type of search system 116.

The suggestion system provides the query 216 to a search system 116 that provides a result value 218 for the time-sensitive attribute included in the query 216. In the example process, the result value 218 is "10:30 a.m.," indicating that the departure time of Flight 406 is 10:30 a.m. In implementations where user feedback is requested, the suggestion system 110 may only generate and provide the query 216 to the search system 116 in response to receiving user input indicating that the time-sensitive attribute value should be updated. A query may be generated, for example, in response to the user device 202 accessing a document, and or in response to user input that indicates a value should be updated. For example, when an e-mail that includes the document text 204 is accessed by the user device 202, the document system 108 may prompt the user of the user device 202, requesting the user's permission to check for updates to the departure gate and/or departure time included in the e-mail.

The suggestion system 110 and/or document system 108 may provide the result value 218 to the user device 202, e.g., for display and/or to replace the first value 214 in the document text, e.g., "9:30 a.m." In some implementations, the document system 108 provides result data 220 to the user device, and the result data 220 causes presentation of the result value 218 at the user device, e.g., in a prompt and/or replacing the original value. In some implementations, the suggestion system 110 and/or document system 108 may replace the first value 214 in the document text 204 with the result value 218 and cause the updated text to be stored in the document data 112.

In implementations where tags are generated for time-sensitive attributes, the tag may cause the first value 214, e.g., "9:30 a.m.," to be updated in response to a predetermined action. Predetermined actions may include, for example, the document being accessed by a user device, receipt of user input indicating that the first value 214 should be updated, or receipt of a request to update the first value 214 from the document system 108. In some implementations, values may be updated periodically, e.g., in batch computations, where documents are periodically updated according to a predetermined schedule. The update operations may, in some implementations, be initiated by the user device, e.g., by a client application, such as a web browser, or by the document system, e.g., upon detecting that the document has been accessed.

While various components, such as the document system 108, suggestion system 110, and search system 116 are depicted separately in the illustration of the example process 200, the components may be included in a single system, as shown by the dotted line encompassing the components, or a different combination of systems than the depicted combination, e.g., in a system including a separate entity identification component.

Figure 3:
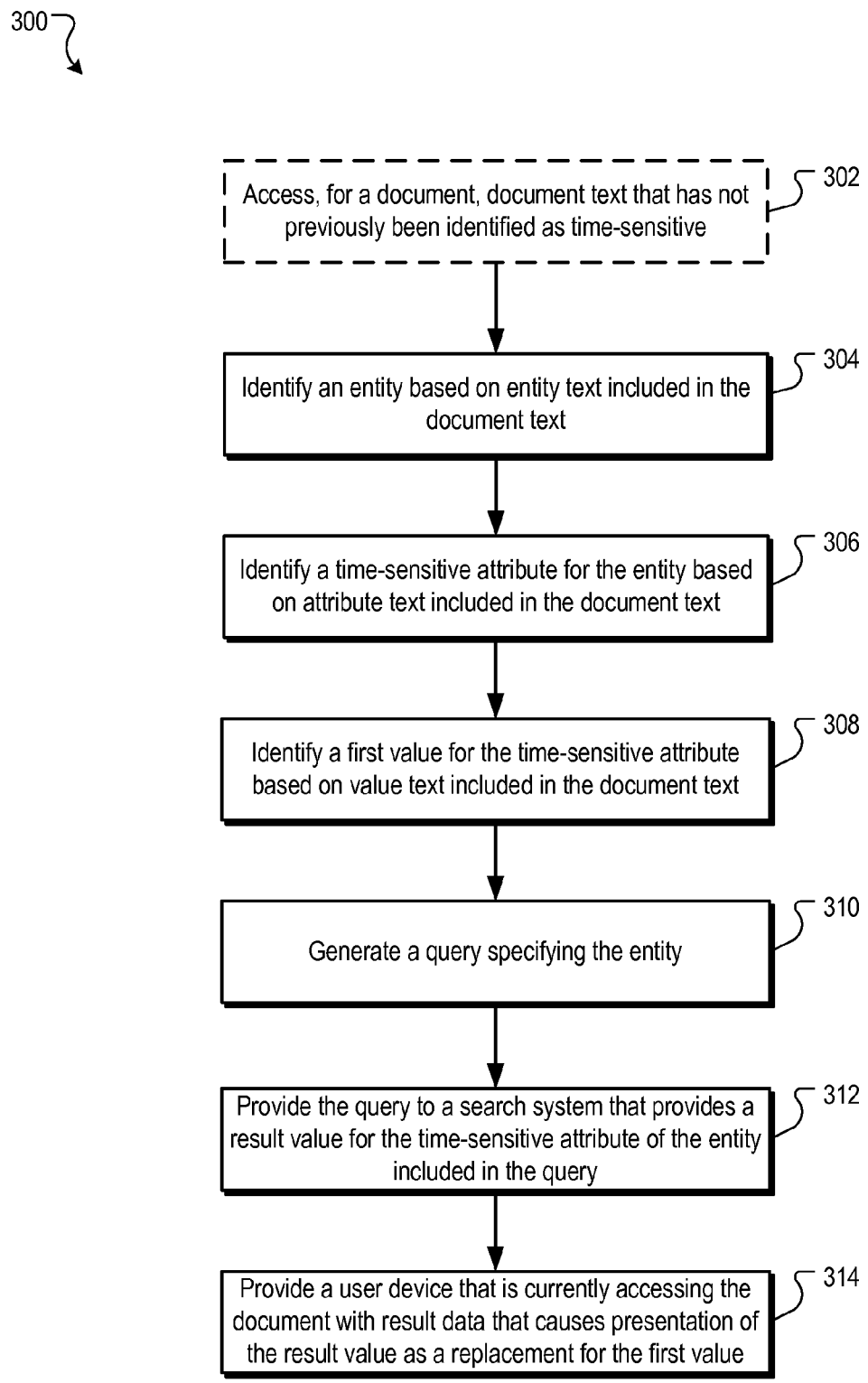
FIG. 3 is a flow diagram of an example process in which suggestions are provided for time-sensitive attributes in a document.

FIG. 3 is a flow diagram of an example process 300 in which suggestions are provided for time-sensitive attributes in a document. The process 300 may be performed by a suggestion system, such as the system described above with reference to FIG. 2.

In some implementations, document text that has not previously been identified as time-sensitive is accessed for a document (302). Document text may, for example, be provided by a user device for inclusion in a document, or may be obtained from a document that has already been drafted. By way of example, a document may be a letter that includes the salutation, "To: John Doe, President of Widgets and More."

An entity is identified based on entity text included in the document text (304). For example, the salutation, "To: John Doe, President of Widgets and More," may be provided to an entity identification model that identifies the entities referred to by the entity text "John Doe," and/or the entity text, "President of Widgets and More."

A time-sensitive attribute is identified for the entity based on attribute text included in the document text (306). In some implementations, a time-sensitive attribute is identified for an entity by determining that the time-sensitive attribute is included in a list of predetermined time-sensitive attributes. For example, a list of predetermined time-sensitive attributes may include: a price, an age, an environmental condition, a person holding a title, or a time. In some implementations, time-sensitive attributes may be identified by a tag or attribute in an index, e.g., the entity, the president of Widgets and More, may have several time-sensitive attributes associated with it in an index of entities, such as the person holding the title, the salary, and the time since the position was created. In the example document text, "To: John Doe, President of Widgets and More," the person holding the title, e.g., John Doe, may be identified as a time-sensitive attribute of the entity, the president of Widgets and More.

A first value is identified for the time-sensitive attribute based on value text included in the document text (308). For example, "John Doe," may be identified as the first value for attribute, the person holding the title, for the entity, the president of Widgets and More.

In some implementations, data is provided to a user device that is currently accessing the document that causes a prompt to be displayed for the first value, the prompt including a user-selectable interface element that will cause the first value to be updated. For example, a user accessing the letter to the president of Widgets and More may be provided with the prompt, "do you want the document system to update the person holding the title of president of Widgets and More if it is different from the value you provided?" In some implementations, the user-selectable interface element will cause the first value for the time-sensitive attribute to be tagged as a time-sensitive attribute value. For example, the user accessing the letter to the president of Widgets and More may be provided with the prompt, "do you want the document system to tag the person holding the title of president of Widgets and More as time-sensitive and keep it updated?" In these implementations, updating the first value may depend upon the user input. For example, if the user does not want the value tagged or updated, the value will not be tagged or updated.

In implementations where a time-sensitive attribute value is tagged, a tag may be generated for the first value in response to receiving user input indicating a selection of a user interface element. The tag indicates that the first value is time-sensitive, and the tag causes the first value to be updated in response to one or more predetermined actions. For example, the predetermined action(s) may include: the document being accessed by a user device, receipt of user input indicating that the first value should be updated, or receipt of a request to update the first value from a document system. In some implementations, the user may be allowed to select the method used for updating the first value, e.g., the user may specify that the first value should be updated immediately and/or on each subsequent opening of the document.

A query is generated specifying the entity (310). In some implementations, the query also specifies the time-sensitive attribute for the entity. Using the previous example, a query may be, "current president of Widgets and More?" Other queries, such as database queries, may also be generated, e.g., depending on the type of query handled by a search system. Alternatively, a knowledge base may be searched for the entity company "Widgets and More," and the corresponding current president can be identified.

The query is provided to a search system that provides a result value for the time-sensitive attribute of the entity included in the query (312). For example, an Internet search engine may be provided with the query, "who is the current president of Widgets and More?" An example result value provided by the search system may be "Jane Roe." A search system may have access to a number of different resources for identifying current time-sensitive attribute values for entities. For example, an entity database may be maintained and updated as new information is learned by the entity system. Recent news articles, social media data, and available user data may also be searched by the search system to identify current values for a time-sensitive attribute.

A user device that is currently accessing the document is provided with result data that causes presentation of the result value as a replacement for the first value (314). For example, the text, "Jane Roe," may automatically replace the text, "John Doe," in the document text, "To: John Doe, President of Widgets and More," so that it reads, "To: Jane Roe, President of Widgets and More." In some implementations, a user notification may be provided, such as a pop-up or highlighting, to indicate that the value was updated. As another example, the user of the user device may instead be prompted with the result value, e.g., "The document system has determined that the current president of Widgets and More is "Jane Roe," would you like to replace "John Doe" with "Jane Roe?""

In a situation where the result value is the same as the first value, e.g., the current president of Widgets and More is still John Doe, the user may not be provided with the result value. In some implementations, the result value has a confidence score that indicates a confidence that the result value is correct for the time-sensitive attribute of the entity. In these implementations, a determination may be made, based on the confidence score for the result value, that the result value will be provided to the user device, and the result data may only be provided in response to this determination. For example, a predetermined confidence score threshold may be used to throttle the provision of result values as suggestions to user devices, e.g., a result value must have a confidence score above 0.75 to be provided to the user device as a suggested update.

While the above example uses the president of Widgets and More as the example entity in the document text, "To: John Doe, President of Widgets and More," other examples may also exist. As another example, the "president of Widgets and More" may be identified as a time-sensitive attribute value for an attribute of the entity, John Doe, e.g., it may be John Doe's current title. In this example, John Doe's current title may be identified, e.g., from social media data or a signature in e-mail communications with the user of the user device accessing the document, and the current title may be provided as a suggestion. In this example, if John Doe has a new title, such as, "president of Widgets Plus," the new title may be offered as a result value to replace the old title, causing the updated document text to read, "To: John Doe, President of Widgets Plus."

Figure 4:
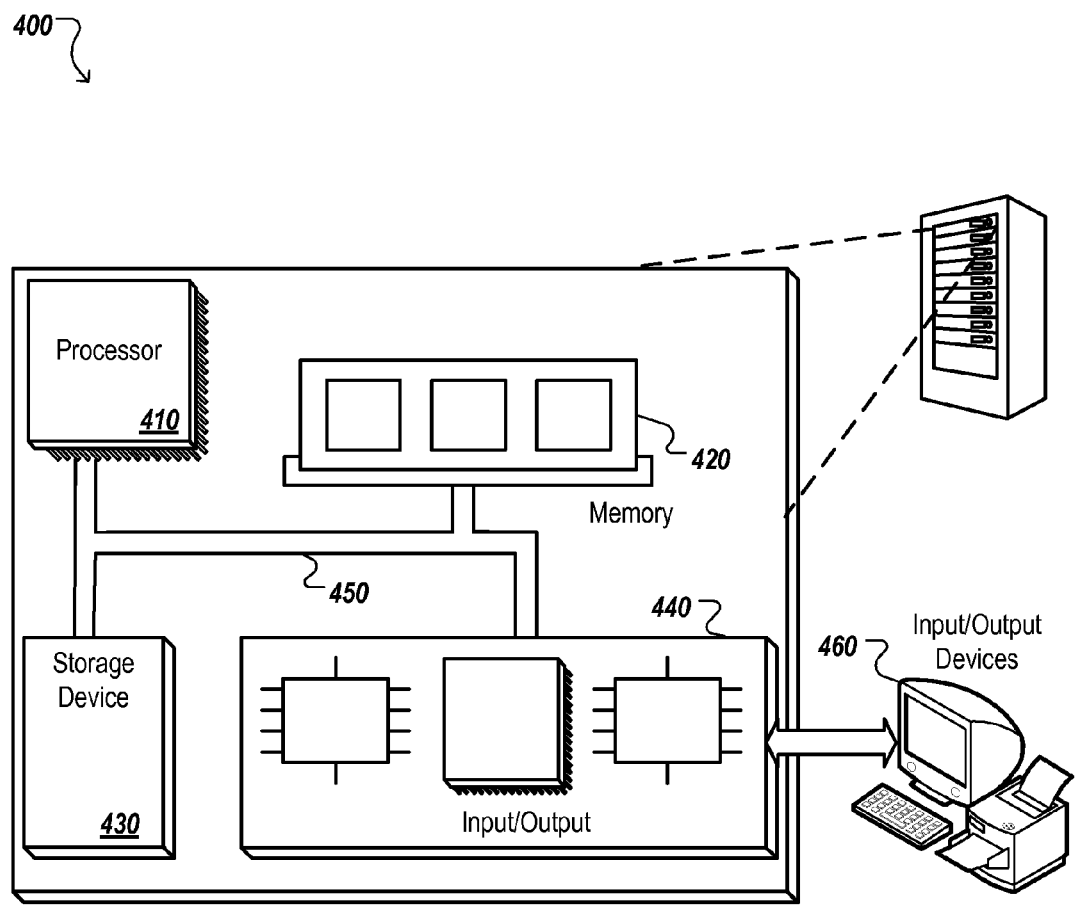
FIG. 4 is a block diagram of an example data processing apparatus.

FIG. 4 is a block diagram of an example data processing apparatus 400. The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
    serving, to a user device, a document that includes value text that specifies a first value that is not tagged as a time sensitive attribute value;
    automatically identifying an entity based on entity text included in document text of the document after serving the document to the user device;
    automatically, after the document is served to the user device, identifying a time-sensitive attribute for the entity specified by attribute text included in the document text, wherein attributes identified by the document text have not previously been identified for the document as time-sensitive before serving the document;
    identifying the first value for the time-sensitive attribute based on the value text included in the document text;
    providing data to the user device that causes a prompt to be displayed in the document, the prompt identifying the first value for the time-sensitive attribute and including a user-selectable interface element that, upon selection, will cause the first value for the time-sensitive attribute to be tagged as a time-sensitive attribute value; and
    generating, responsive to a selection of the user-selectable interface element, a tag for the first value for the time-sensitive attribute in response to receiving user input indicating a selection of the user-selectable interface element, the tag indicating that the first value is time-sensitive, and wherein the tag causes the value text specifying the first value to be updated in response to one or more predetermined actions;
    responsive to generating the tag, generating a query specifying the entity;
    providing the query to a search system that provides a result value for the time-sensitive attribute of the entity included in the query;
    providing, to a user device that is currently accessing the document, result data that causes presentation of the result value as a replacement for the first value as indicated by the tag.

2. The method of claim 1, further comprising:
    providing data to a user device that is currently accessing the document that causes a prompt to be displayed for the first value, the prompt including a user-selectable interface element that will cause the first value to be updated, and wherein the providing the query and providing the user device with result data are performed only in response to receiving user input indicating selection of the user-selectable interface element.

3. The method of claim 1, wherein the one or more predetermined actions comprise one or more of:
    the document being accessed by a user device;
    receipt of user input indicating that the first value should be updated; or
    receipt of a request to update the first value from a document system.

4. The method of claim 1, wherein identifying a time-sensitive attribute for the entity based on the attribute text comprises determining that the time-sensitive attribute is included in a list of predetermined time-sensitive attributes.

5. The method of claim 4, wherein the list of predetermined time-sensitive attributes comprises one or more of:
    a price;
    an age;
    an environmental condition;
    a person holding a title; or
    a time.

6. The method of claim 1, wherein the query specifies the time-sensitive attribute for the entity.

7. The method of claim 1, wherein the document text is edited by the user device to add the entity text.

8. The method of claim 1, wherein the document is authored by the user device that is currently accessing the document.

9. A system comprising:
    one or more data processing apparatus; and
    a data storage device storing instructions that, when executed by the one or more data processing apparatus, cause the one or more data processing apparatus to perform operations comprising:
        serving, to a user device, a document that includes value text that specifies a first value that is not tagged as a time sensitive attribute value;

automatically identifying an entity based on entity text included in document text of the document after serving the document to the user device;

automatically, after the document is served to the user device, identifying a time-sensitive attribute for the entity specified by attribute text included in the document text, wherein attributes identified by the document text have not previously been identified for the document as time-sensitive before serving the document;

identifying the first value for the time-sensitive attribute based on the value text included in the document text;

providing data to the user device that causes a prompt to be displayed in the document, the prompt identifying the first value for the time-sensitive attribute and including a user-selectable interface element that, upon selection, will cause the first value for the time-sensitive attribute to be tagged as a time-sensitive attribute value; and generating, responsive to a selection of the user-selectable interface element, a tag for the first value for the time-sensitive attribute in response to receiving user input indicating a selection of the user-selectable interface element, the tag indicating that the first value is time-sensitive, and wherein the tag causes the value text specifying the first value to be updated in response to one or more predetermined actions;

responsive to generating the tag, generating a query specifying the entity;

providing the query to a search system that provides a result value for the time-sensitive attribute of the entity included in the query;

providing, to a user device that is currently accessing the document, result data that causes presentation of the result value as a replacement for the first value as indicated by the tag.

10. The system of claim 9, wherein the operations further comprise:

providing data to a user device that is currently accessing the document that causes a prompt to be displayed for the first value, the prompt including a user-selectable interface element that will cause the first value to be updated, and wherein the providing the query and providing the user device with result data are performed only in response to receiving user input indicating selection of the user-selectable interface element.

11. The system of claim 10, wherein the one or more predetermined actions comprise one or more of:
the document being accessed by a user device;
receipt of user input indicating that the first value should be updated; or
receipt of a request to update the first value from a document system.

12. The system of claim 9, wherein identifying a time-sensitive attribute for the entity based on the attribute text comprises determining that the time-sensitive attribute is included in a list of predetermined time-sensitive attributes.

13. The system of claim 12, wherein the list of predetermined time-sensitive attributes comprises one or more of:
a price;
an age;
an environmental condition;
a person holding a title; or
a time.

14. The system of claim 9, wherein the query specifies the time-sensitive attribute for the entity.

15. The computer system of claim 9, wherein the document text is edited by the user device to add the entity text.

16. The system of claim 9, wherein the document is authored by the user device that is currently accessing the document.

17. A computer readable medium storing instructions that, when executed by one or more data processing apparatus, cause the one or more data processing apparatus to perform operations comprising:

serving, to a user device, a document that includes value text that specifies a first value that is not tagged as a time sensitive attribute value;

automatically identifying an entity based on entity text included in document text of the document after serving the document to the user device;

automatically, after the document is served to the user device, identifying a time-sensitive attribute for the entity specified by attribute text included in the document text, wherein attributes identified by the document text have not previously been identified for the document as time-sensitive before serving the document;

identifying the first value for the time-sensitive attribute based on the value text included in the document text;

providing data to the user device that causes a prompt to be displayed in the document, the prompt identifying the first value for the time-sensitive attribute and including a user-selectable interface element that, upon selection, will cause the first value for the time-sensitive attribute to be tagged as a time-sensitive attribute value; and generating, responsive to a selection of the user-selectable interface element, a tag for the first value for the time-sensitive attribute in response to receiving user input indicating a selection of the user-selectable interface element, the tag indicating that the first value is time-sensitive, and wherein the tag causes the value text specifying the first value to be updated in response to one or more predetermined actions;

responsive to generating the tag, generating a query specifying the entity;

providing the query to a search system that provides a result value for the time-sensitive attribute of the entity included in the query;

providing, to a user device that is currently accessing the document, result data that causes presentation of the result value as a replacement for the first value as indicated by the tag.

18. The computer readable medium of claim 17, wherein the operations further comprise:

providing data to a user device that is currently accessing the document that causes a prompt to be displayed for the first value, the prompt including a user-selectable interface element that will cause the first value to be updated, and wherein the providing the query and providing the user device with result data are performed only in response to receiving user input indicating selection of the user-selectable interface element.

19. The computer readable medium of claim 17, wherein the document text is edited by the user device to add the entity text.

20. The computer readable medium of claim 17, wherein the document is authored by the user device that is currently accessing the document.

* * * * *